United States Patent [19]
Shaffer

[11] 3,730,999
[45] May 1, 1973

[54] TELEPHONE RING-TRIP CIRCUIT

[75] Inventor: William E. Shaffer, Rochester, N.Y.

[73] Assignee: Stromberg-Carlson Corporation, Rochester, N.Y.

[22] Filed: Oct. 26, 1971

[21] Appl. No.: 192,020

[52] U.S. Cl. ............179/84 R, 179/18 HB, 179/84 L
[51] Int. Cl. ............H04m 3/02
[58] Field of Search ............179/84 R, 84 L, 90 K, 179/18 HB, 81 R, 81 C

[56] References Cited

UNITED STATES PATENTS 3,321,583 5/1967 Maul....................179/84 R
3,187,106 6/1965 Steinmetz....................179/84 R
3,591,728 7/1971 Birck....................179/84 R

*Primary Examiner*—Thomas W. Brown
*Attorney*—Charles C. Krawczyk

[57] ABSTRACT

A discharge circuit prevents charge buildup on the plates of a capacitor in a telephone ring-trip circuit over each A.C. cycle of ringing current until a telephone call is answered, thereby avoiding premature ring-trip operation. During the application of a ringing signal through the ring-trip circuit, the capacitor charges up during a first half of each A.C. cycle and discharges through the discharge circuit during a portion of the second half of each A.C. cycle.

11 Claims, 3 Drawing Figures

Patented May 1, 1973 3,730,999

3 Sheets-Sheet 1

WILLIAM E. SHAFFER
INVENTOR

BY [signature]
ATTORNEY

WILLIAM E. SHAFFER
*INVENTOR.*

BY

Charles C Kavanagh

ATTORNEY

Patented May 1, 1973 3,730,999

3 Sheets-Sheet 3

WILLIAM E. SHAFFER
INVENTOR.

BY Charles C. Krawczyk

ATTORNEY

TELEPHONE RING-TRIP CIRCUIT

BACKGROUND OF THE INVENTION

This invention relates in general to telephone ringing circuits and, in particular, to ring-trip circuits for interrupting the ringing signal once a call is answered.

Ringing signals are used in telephone systems to apprise a telephone subscriber of the presence of an incoming call on his telephone line. A ringing signal consists of periodic ringing bursts of A.C. current having a frequency, for example, of 20 cycles and a duration of perhaps 1 second separated by intervals of no current having a duration of perhaps 3 seconds. When the ringing signal is applied to an audible device in the signalling circuit of a telephone set, each A.C. ringing burst causes the device to produce an audible signal while each separating interval results in a silent period. The RMS value of the voltage of the A.C. bursts at the generator terminals is approximately 120 volts which is high enough to produce at least discomfort and possible harm to a called subscriber if he places the telephone receiver to his ear while the ringing signal is applied to the telephone line. It is therefore important that the ringing signal be interrupted as quickly as possible once a call is answered to avoid applying the ringing signal to the telephone receiver of the called subscriber.

The interruption of the ringing signal is performed by a ring-trip circuit located in the telephone ringing circuit which detects when a call is answered and thereupon causes the ringing generator, which generates the A.C. ringing current, to be disconnected from the telephone line. The ringing signal is applied to the telephone line through the ring-trip circuit and a battery connected in series with the ringing generator. Until a call is answered and the telephone set communication apparatus is placed across the telephone line by lifting of the handset from its cradle, no path exists for the flow of D.C. current. D.C. current is blocked in the telephone signalling circuit by such as a capacitor or a zener diode. The lifting of the telephone handset by the called subscriber places a load across the telephone line which permits the flow of D.C. current which is then used for detecting when the call is answered.

The ring-trip circuit contains a ring-trip relay having two windings connected in the ringing signal path which are designed so that the magnetic flux produced by the portion of the ringing current through one winding cancels the magnetic flux produced by the current in the other winding. Consequently, the ring-trip relay is not actuated by the A.C. ringing bursts. The ring-trip relay is actuated, however, by the D.C. current which produces unbalanced magnetic flux conditions in the windings by means of a capacitor connected in series with one of the windings. As the D.C. current through the winding deposits more charge on the plates of the capacitor, more current tends to flow through the other winding until there is a sufficient current and consequently flux unbalance in the relay windings to actuate the relay. The time constant for charging the capacitor is slow with respect to the frequency of the A.C. ringing current so that the net flux unbalance necessary to actuate the relay cannot be achieved before the A.C. current changes direction and discharges the capacitor once during each A.C. cycle. Thus, the relay remains insensitive to the ringing signal, but not to the D.C. current which indicates that the call has been answered upon lifting of the telephone handset.

As long as the A.C. ringing current remains equal during the first and second halves of each A.C. cycle, a net charge cannot build up on the capacitor plates and the ring-trip relay does not operate until a call is answered. Problems arise, however, when A.C. rectifying components, such as diodes and neon lamps, are placed in telephone set signalling circuits. These components are commonly used in key telephone sets which can be selectively connected to more than one telephone line, the selection being made by push buttons on the telephone set. For instance, in one type of key telephone arrangement commonly referred to as the common audible circuit, a single audible device, such as a buzzer, responds to a ringing signal on any one of a plurality of connected telephone lines while each of the telephone lines has associated with it an individual neon lamp for indicating on which line an incoming call is present. Each neon lamp lights only when a ringing signal is applied to its associated telephone line, thereby uniquely identifying that telephone line. In another type of key telephone arrangement, both an individual neon lamp and individual bell ringer are provided for each telephone line. In a key telephone arrangement, more than the usual ringing current is usually drawn during signalling since each individual telephone line is ordinarily connected to more than one telephone. This aggravates the ring-trip problem and increases the likelihood of premature ring-trip operation.

The use of diodes in telephone signalling circuits results in an A.C. ringing current which is half-wave rectified. Thus, during one half of the A.C. cycle, there is current conduction while during the other half, there is none. Although neon lamps do not produce half-wave rectification, they do cause disproportionate currents to flow during the first and second halves of each A.C. cycle. Since a threshold voltage must be exceeded for current to flow through a neon lamp, more current flows through the lamp during the half cycle when the polarity of the A.C. voltage produced at the terminals of the ringing generator is such as to aid the series battery than when it is opposed to it.

The use of the foregoing components may cause premature ring-trip operation viz. actuation of the ring-trip relay before a call has been answered. Since unequal currents pass through the capacitor during the first and second halves of each A.C. cycle, a net charge is deposited on the plates of the capacitor with each passing A.C. cycle. After a number of A.C. cycles, a sufficient amount of charge may be deposited on the plates of the capacitor to produce enough current and flux unbalance in the windings of the ring-trip relay to actuate it. Thus, the ringing signal is terminated and the connection broken before the called subscriber answers the call. The interruption of the ringing signal prematurely is highly undesirable since it detracts from the efficient operation of a telephone system and contributes to telephone customer dissatisfaction.

It is therefore an object of the invention to provide an improved telephone ring-trip circuit which is not susceptible to premature ring-trip operation as a result of full and/or partial half-wave rectification of the A.C. ringing current.

It is a further object of the invention to provide discharge circuit means for preventing charge buildup on the plates of capacitors in telephone ring-trip circuits over each A.C. cycle of ringing current until a telephone call is answered.

BRIEF DESCRIPTION OF THE INVENTION

Discharge circuit means provides a discharge path for preventing charge buildup on the plates of a capacitor in a telephone ring-trip circuit over each A.C. cycle of ringing current until a telephone call is answered, thereby avoiding premature ring-trip operation. During the application of a ringing signal through the ring-trip circuit, the capacitor charges up during a first half of each A.C. cycle and discharges through said discharge circuit means during a portion of the second half of each A.C. cycle. In one embodiment, said discharge circuit means is connected in the ringing circuit across the ring-trip circuit and the ringing generator. In two other embodiments, said discharge circuit means are located in the telephone set signalling circuits.

DESCRIPTION OF THE PREFERRED EMBODIMENTS

Figure 1:
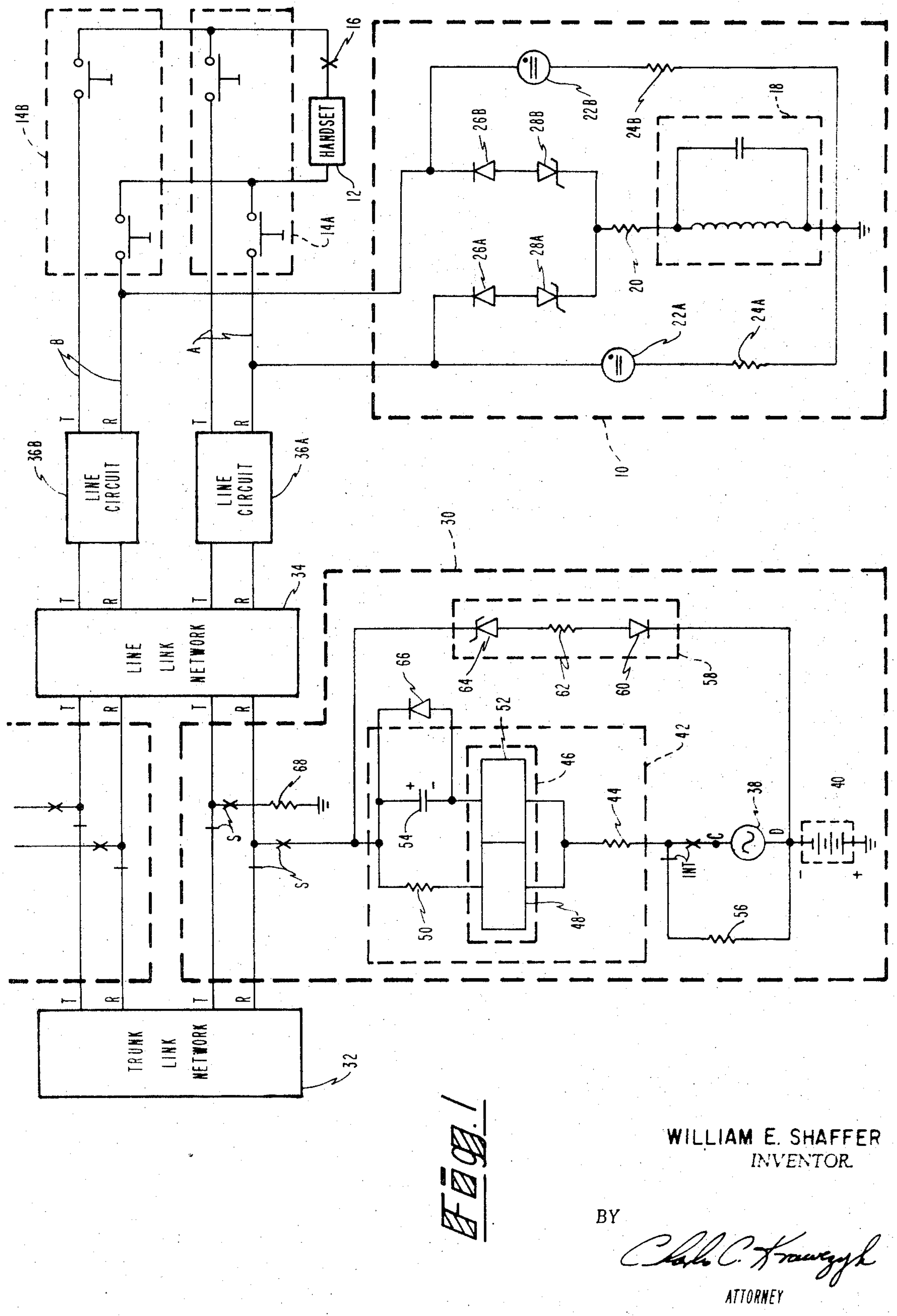
FIG. 1 shows a first embodiment of the invention wherein the discharge circuit means is located in a ringing circuit.

In FIG. 1, reference numeral 10 designates the signalling circuit of a key telephone set (not shown) with a handset 12 which can be selectively connected to any one of a plurality of separate telephone lines, such as A and B, through a pair of push button gang operated switches 14A and 14B, respectively. Switch 16 represents the telephone hookswitch which is closed to complete a telephone connection when the handset 12 is lifted from its cradle.

Each of the telephone lines A and B consists of a tip and ring conductor respectively labelled T and R. A single audible signalling device 18, such as a buzzer, is connected preferably between each of the ring conductors of lines A and B and ground through a current limiting resistor 20 and a diode circuit described below. The signalling device 18 responds to a ringing signal on either telephone line A or B by producing an audible signal apprising the telephone subscriber of an incoming call. Neon lamps 22A and 22B are connected between the ring conductors of lines A and B and ground, respectively, through current limiting resistors 24A and 24B to provide a visual indication to the telephone subscriber over which line the incoming call is being made. A pair of diodes 26A and 26B isolates each of the neon lamps from the line with which it is not associated, so that a neon lamp is energized only when a ringing signal is applied to the ring conductor to which it is directly connected (neon lamp 22A for ringing on line A and neon lamp 22B for ringing on line B). Zener diodes 28A and 28B are designed to prevent the false operation of the signalling device 18 due to nonringing battery (D.C.) line voltages which are present. The key telephone set signalling circuit just described is commonly referred to as the common audible circuit previously alluded to.

The ringing signal may be generated in a ringing circuit, such as described in detail in a copending application for Otto Altenburger, entitled "Ringing Control Circuit," Ser. No. 100,647, and which is shown partially in FIG. 1 as reference numeral 30. In this system, chosen only for purposes of describing the invention (since the invention is compatible with any type of ringing system which uses a ring-trip circuit as described below), each telephone connection between subscribers requires a ringing control circuit located between a trunk link network 32 and a line link network 34 which form a part of the telephone system. The other side of the trunk of network 32 connects to the calling subscriber through a variety of equipment well known in the art. The other side of the link of network 34 connects to the called subscriber through a line circuit associated with the line on which the incoming call is placed. Assuming that an incoming call is being made on line A of FIG. 1, a line circuit 36A associated with line A is connected through line link network 34 to the ringing control circuit 30.

Assuming that line A is idle, as determined by a standard idle-busy test, a ringing signal is applied to the ring conductor of line A by the ringing circuit 30 upon the closing of a pair of normally open contacts S controlled by a relay which is not shown. The operation of this relay also opens a pair of normally closed contacts S located in the communication path which prevents the ringing signal from being transmitted back to the calling subscriber.

An AC voltage is continuously produced at the output terminals C and D of an A.C. ringing generator 38. Terminal D of generator 38 is connected to the negative terminal of the office battery 40, the positive terminal of which is connected to ground. The other terminal C of generator 38 is connected to the ring conductor (of the communication path between the trunk link network 32 and the line link network 34) through normally open contacts S and a ring-trip circuit 42 which comprises a current limiting resistor 44 in series with two parallel paths, each having a coil of a dual coil ring-trip relay 46 connected therein. One path contains a coil 48 of relay 46 connected in series with a resistor 50 while the other path contains a coil 52 of relay 46 connected in series with a capacitor 54. The silent period of the ringing signal is produced by periodically disconnecting the A.C. generator 38 from the ring conductor through the normally open contacts INT of a relay which is not shown. During the silent period, the normally closed contacts INT maintains the connection between the telephone of the called subscriber and the telephone switching network through the battery 40 and a current limiting resistor 56. When the voltage at terminal C of generator 38 is positive with respect to terminal D, the voltage VCD across the terminals C and D is considered positive. When the voltage at C is negative with respect to D, VCD is considered negative.

Since a threshold voltage must be exceeded for current to flow through a neon lamp, such as 22A, in the signalling circuit 10, more current is conducted therethrough during one half cycle of the A.C. signal (VCD negative so that generator and battery voltages are aiding each other) than during the other half cycle (VCD positive so that generator and battery voltages are opposing each other). Furthermore, the presence of a diode, such as 26A, in series with the audible signalling device 18 produces a half-wave A.C. rectified ringing current comprised of D.C. pulses (during the portion of the half cycle when VCD is negative and the voltage across the zener diode 28A is great enough to break it down) and at other times the current through the device 18 is zero. These two rectified currents result in a continuous build up of charge on the plates of the capacitor 54 (in the polarity shown) with each passing A.C. cycle which may eventually cause sufficient current unbalance and, consequently, flux unbalance in the coils 48 and 52 of the ring-trip relay 46 to cause the ring-trip relay 46 to operate prematurely before the call has been answered. This undesirable build up of charge is prevented by a discharge circuit 58 of the invention connected between the terminal D of generator 38 and the junction of capacitor 54 and resistor 50 in the ring-trip circuit 42. This discharge circuit 58 includes a diode 60, a resistor 62 and a zener diode 64.

With the inclusion of the discharge circuit 58, two distinct closed paths are available for the flow of current. A first path is the same as if the discharge circuit 58 was not present, namely; from ground, through the battery 40, the generator 38, the ring-trip circuit 42, the ring conductor of line A (including the line circuit 36A and the link network 34), and the signalling circuit 10 back to ground. A second path comprises the ring-trip circuit 42 and the discharge circuit 58 which completes a loop for the flow of current through the ringing generator 38 only. Current cannot flow through this second path when VCD is negative because of the way the diode 60 is poled. Current will flow through this second path only during the half cycle that VCD is positive and there is sufficient voltage across the zener diode 58 to break it down. A portion of this current flows through the capacitor 54. Current will not flow from ground through the battery 40, the discharge circuit 58, the ring conductor of line A and the signalling circuit 10 back to ground because the breakdown voltage of the zener diode 64 is greater than the output voltage of the battery 40. This prevents establishing a D.C. path before the call is answered.

During a portion of each half cycle when VCD is negative, current flows through the first path energizing the signalling device 18 and the neon lamp 22A. A portion of this current flows through the capacitor 54 charging it with the polarity shown. During a portion of each half cycle when VCD is positive, current flows in the opposite direction through both the first and second paths. As already indicated, the current through the first path via the neon lamp 22A is not great enough to nullify the charge on the capacitor 54 so as to prevent a buildup of charge thereon with each passing A.C. cycle. The current through the second path, however, because of the small loop impedance and opposite driving voltage of generator 38, is great enough so that the portion of current which flows through the capacitor 54 is able to remove enough charge on the plates to prevent a charge buildup. Without the buildup of this charge on the capacitor plates, the ring-trip relay 46 will not be operated prematurely. A diode 66 can be connected across the capacitor 54 to prevent a substantial buildup of charge in a polarity opposite to that shown when VCD is positive (after first removing the charge developed when VCD was negative). Thus, the diode 66 limits the voltage which can be developed across the capacitor to approximately 0.7 volts when VCD is positive, limiting the amount of charge which must first be removed when VCD becomes negative.

When the called subscriber responds to the call, the lifting of the handset 12 closes the hookswitch 16, thus, placing across line A a low impedance load which completes a D.C. path for the flow of current from the battery 40. This path can be traced from ground through the battery 40, the generator 38 (or resistor 56 during the silent period), the ring-trip circuit 42, the ring conductor of line A, the handset 12 and the tip conductor of line A back to ground through a current limiting resistor 68. The zener diode 64 is designed to block the flow of any portion of this D.C. current through the discharge circuit 58, which would otherwise bypass the capacitor 54 and slow down the operation of the ring-trip relay 46. The portion of this D.C. current which flows through the capacitor 54 continues to charge it in the polarity shown until sufficient current and flux unbalance is produced to operate the ring-trip relay 46, the operation of which causes other relays (not shown) to be operated, resulting in the actuation of the S contacts back to their normal states. The normally open S contacts open to disconnect the ringing generator 38 from line A while the normally closed S contacts close to complete the communication path between subscribers.

The following combination of elements has been found to provide satisfactory performance when used with a telephone line having a resistance of 1,000 ohms or less:

| Item | Reference Numeral | Value |
|---|---|---|
| Battery | 40 | 44–54 volts |
| A.C. ringing signal | | 120 volts RMS |
| Ring-Trip Relay | 46 | Medium Size Reed Type |
| Coil 1 | 48 | 4,000 turns, 840 ohms |
| Coil 2 | 52 | 10.860 turns, 3,100 ohms |
| Capacitor | 54 | 70 microfarads |
| Resistor | 50 | 340 ohms |
| Resistor | 44 | 0 ohms |
| Resistor | 62 | 1,000 ohms |
| Zener Diode | 64 | 68 volts, breakdown voltage |

As the resistance of a telephone line increases (as the result of longer lines or utilization of smaller conductors), the time for the ring-trip relay 46 to operate once a call is answered (the hookswitch 12 closed) also increases since the D.C. charging path for operating the ring-trip relay 46 is through the increased resistance of the telephone line. Thus, a longer time period is required to build up sufficient charge on capacitor 54 to create enough current and flux unbalance in the ring-trip relay 46 to operate it. In contrast to this, the discharge period of the discharge circuit 58 remains constant since elements having fixed values are used in the ringing control circuit. Because the time constant of the discharge path remains constant while the time constant of the D.C. charging path increases as the resistance of a telephone line is increased, a point is reached where sufficient charge cannot be placed on the plates of capacitor 54 to operate the ring-trip relay 46 before the charge is removed from the capacitor by the discharge circuit 58 during an A.C. ringing burst. At that point, the ringing signal will not be removed from the telephone line of the called subscriber until a silent period of the ringing signal occurs which permits sufficient time for charge to build up on the plates of the capacitor 54 to actuate the ring-trip relay 46. In such a situation should a subscriber answer a call during the application of a ringing burst, the ringing signal will not be immediately terminated but will continue to be applied to the telephone line until a silent period follows. Therefore, when the ringing circuit might be connected to telephone lines having resistances in excess of that which might result in the failure of the ring-trip relay to operate properly, the discharge circuit 58 of the invention is not suited for use by connecting it into the ringing circuit 30.

Figure 2:
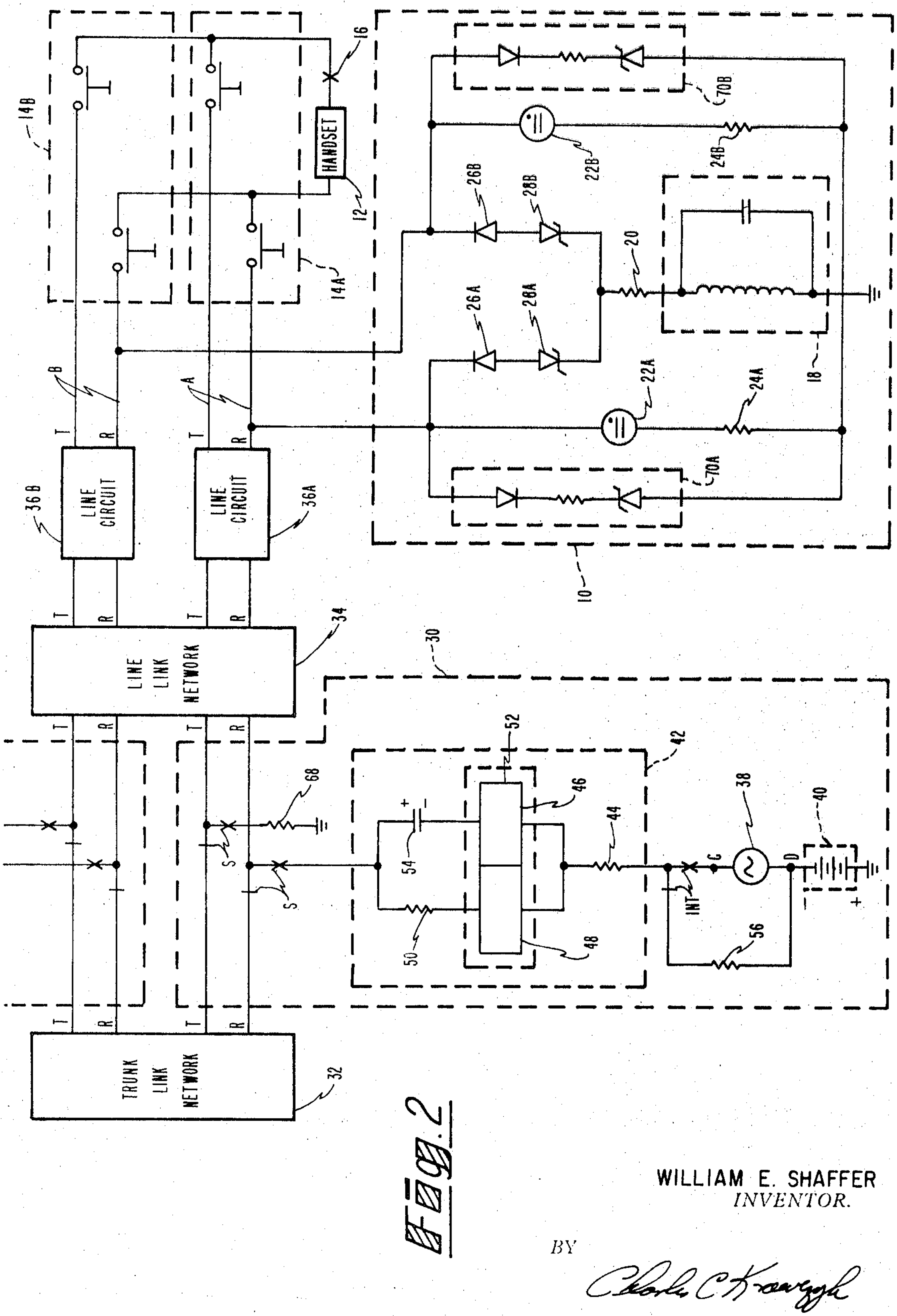
FIG. 2 shows a second embodiment of the invention wherein the discharge circuit means is located in one type of signalling circuit of a key telephone set.

With the above mentioned combination of circuit components, the installation of the discharge circuit 58 in the ringing circuit has been found to provide satisfactory performance so long as the resistance of the called subscriber's telephone line is 1,000 ohms or less. When the resistance exceeds 1,000 ohms, the discharge circuit means can be installed in the telephone set itself rather than in the ringing circuit. As shown in FIG. 2 (corresponding elements in FIGS. 1–3 have the same reference numerals), an individual discharge circuit is needed for each separate telephone line connected to the telephone set, each discharge circuit being connected between ground and the ring conductor of its associated line (discharge circuits 70A and 70B being associated with lines A and B, respectively). In this embodiment, when VCD is positive, the capacitor 54 is discharge through a path described by ground, the battery 40, the generator 38, resistor 44, coil 52, the ring conductor of line A and the discharge circuit 70A back to ground. Since the discharge and charging paths are both now through the telephone line, an increase in line resistance will affect each equally and therefore will not result in the possible failure of the ring-trip relay 46 to operate properly. It should be noted that only one discharge circuit is required for each telephone line even if more than one key telephone set is connected to the telephone line. Therefore, in such a case, discharge circuits need be placed in only one of the key telephone sets, one discharge circuit being allocated for each of the individual telephone lines connected thereto.

Figure 3:
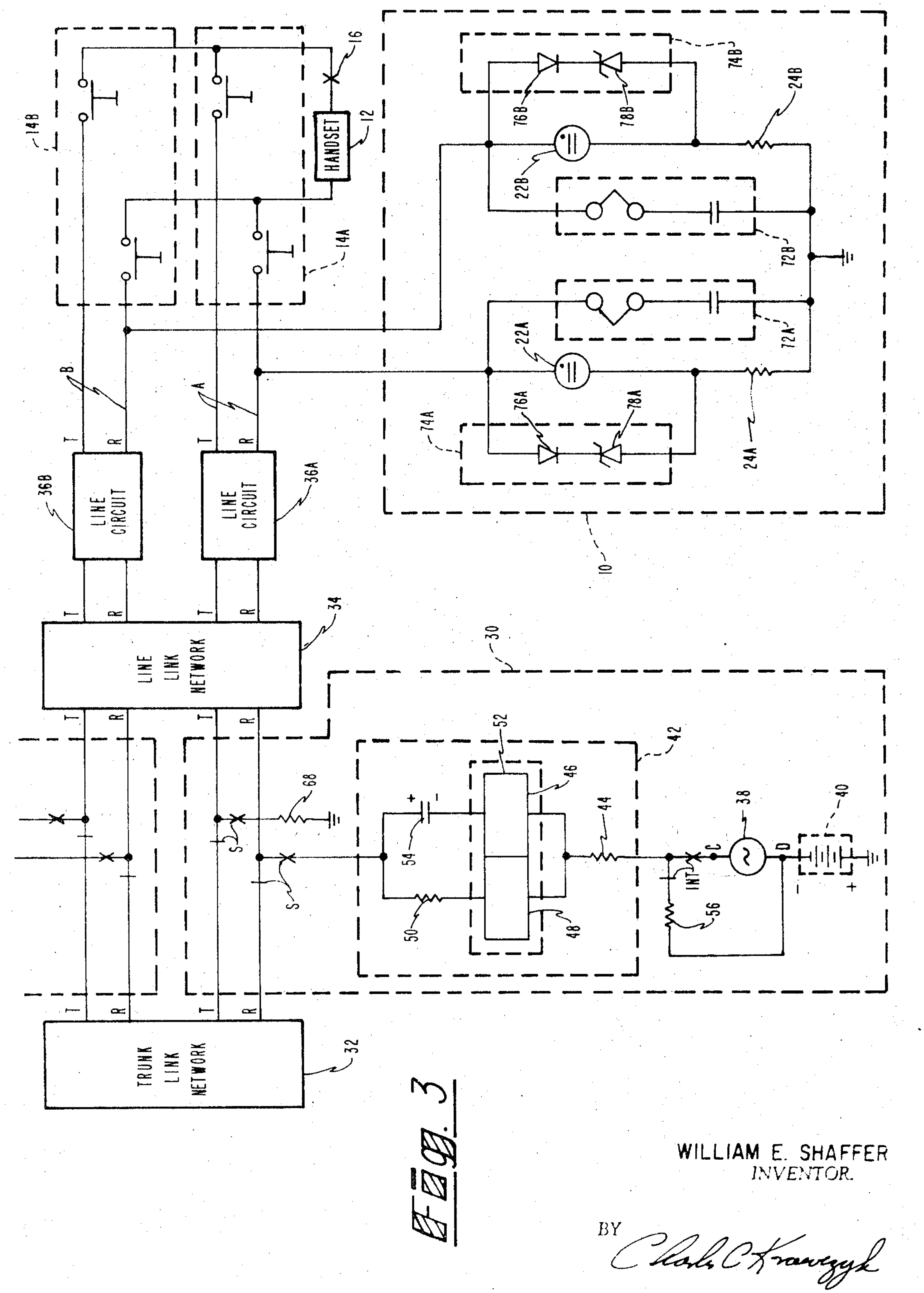
FIG. 3 shows a third embodiment of the invention wherein the discharge circuit means is located in another type of signalling circuit of a key telephone set.

As shown in FIG. 3, some telephones use, in lieu of the common audible circuit, a separate bell ringer (72A for line A and 72B for line B) as well as a separate neon lamp for each telephone line connected to the telephone for signalling purposes. Such an arrangement ameliorates the premature ring-trip problem since the bell ringers 72A and 72B do not introduce A.C. current rectification as does the common audible circuit. In such a case, the A.C. current rectification is caused only by the neon lamps so that the problem can be more simply solved by connecting individual discharge circuits 74A and 74B across the neon lamps 22A and 22B, respectively. Each discharge circuit requires a diode, such as 76A and a zener diode, such as 78A. Since no compensation for the additional current rectification created by the common audible circuit is required here, the discharge and charging time constants can be equal and therefore the same current limiting resistor (24A for line A, and 24B for line B) can be used in both the charging and discharging paths.

Whether used in a telephone set or a ringing circuit, the discharge circuit means of the invention provides a discharge path for preventing charge buildup on the plates of the capacitor in a ring-trip circuit over each A.C. cycle of ringing current until a call is answered. Consequently, premature ring-trip operation is avoided even though A.C. current rectification is produced by the components used in the telephone set signalling circuits.

What is claimed is:

1. An improved ring-trip circuit for connection between a telephone A.C. ringing generator and a telephone line to which the ringing signal is applied wherein the generator signal output is altered by the telephone ringing load so that the current pulses during each first half of the A.C. cycle are greater than those during each second half of the A.C. cycle, and wherein the ring-trip circuit includes a capacitor connected so that when the current through the telephone line deposits a sufficient amount of charge on the plates of said capacitor, the ring-trip circuit is actuated to disconnect the generator from the telephone line, the improvement comprising:

a discharge circuit connected so that said capacitor is discharged through the generator and said discharge circuit whenever the voltage across said discharge circuit exceeds a preset value during each second half of the A.C. cycle.

2. In a ringing circuit for telephone systems including an A.C. ringing generator connected in series with a battery for applying ringing signals to telephone lines through a ring-trip circuit, the ring-trip circuit including a capacitor for detecting when a call is answered, whereupon the generator is disconnected from the telephone line, an improvement comprising:

discharge circuit means for discharging said capacitor through the generator whenever the polarity of the generator output voltage is opposed to that of the battery and the magnitude of the voltage at the generator terminals exceeds a preset value.

3. The improved ring-trip circuit of claim 2 wherein said discharge circuit means comprises the series combination of a resistor, a diode poled to be conductive when the polarity of the generator output voltage is opposed to that of the battery and a zener diode for establishing said preset value.

4. The improved ring-trip circuit of claim 2 including circuit means connected across said capacitor for limiting the amount of charge which is deposited on the plates of said capacitor when the polarity of the generator output voltage is opposed to that of the battery.

5. The improved ring-trip circuit of claim 4 wherein said circuit means is a diode poled to be conductive when the polarity of the generator output voltage is opposed to that of the battery.

6. An improved ring-trip circuit for use in a telephone ringing circuit which includes a ringing generator connected in series with a battery comprising:

two terminals for connecting the ring-trip circuit in series with the generator and a telephone line to be rung;

a dual coil relay having both windings connected between said two terminals whereby the magnetic flux produced in one winding opposes the magnetic flux produced in the other winding when current flows into one terminal and out the other terminal via both windings;

a capacitor connected in series with one of two said windings, and a series circuit connected between the junction of the generator and the battery and the one of said two terminals for connecting the ring-trip circuit to the telephone line, said series circuit including a resistor, a diode poled for conducting current whenever the polarity of the generator output voltage is opposed to that of the battery and a zener diode.

7. The ring-trip circuit of claim 6 including a diode connected across said capacitor poled for conduction when the polarity of the generator output voltage is opposed to that of the battery.

8. Discharge circuit means located in the signalling circuit of a telephone set which is selectively connected to a plurality of telephone lines wherein the signalling circuit includes a plurality of lamp circuits, equal in number to the number of said telephone lines, connected so that each one of said lamp circuits responds to an A.C. ringing signal on a different one of said telephone lines and more ringing current flows through said lamp circuits during each first half of the A.C. cycle than during each second half of the A.C. cycle comprising:

a plurality of discharge circuits equal in number to the number of said lamp circuits, each discharge circuit being connected across a different one of said lamp circuits, responsive to the same ringing signal as the lamp circuit across which it is connected and being rendered conductive whenever the voltage across said discharge circuit exceeds a preset value during each second half of the A.C. cycle.

9. The discharge circuit means of claim 8 wherein each of said discharge circuits comprises the series combination of a resistor, a diode poled to be conductive during each second half of the A.C. cycle and a zener diode for establishing said preset value.

10. A signalling circuit for use in a telephone set responsive to A.C. ringing signals having a D.C. bias on any one of a plurality of telephone lines, each having a pair of conductors selectively connected to said telephone set comprising:

a ground terminal;

audible signalling means connected between said ground terminal and a first one of said conductors of each of said telephone lines for providing an audible signal in response to said A.C. ringing signals;

a plurality of visual signalling devices, each having two terminals, one of which is connected to the first conductor of a different one of said telephone lines, said devices being conductive during a greater portion of each first half of the A.C. cycle than during each second half of the A.C. cycle;

a plurality of resistors, one for each signalling device connected between the other terminal of said device and said ground terminal, and a plurality of discharge circuits, one for each device connected across said device responsive to the same ringing signal as the device across which it is connected and being rendered conductive whenever the voltage across said discharge circuit exceeds a preset value during each second half of the A.C. cycle.

11. The signalling circuit of claim 10 wherein each of said discharge circuits comprises the series combination of a diode poled to be conductive during each second half of the A.C. cycle and a zener diode for establishing said preset value.

* * * * *